S. C. ROSENBERG.
TREE FELLING DEVICE.
APPLICATION FILED JAN. 28, 1919.
1,322,468.
Patented Nov. 18, 1919.
2 SHEETS—SHEET 1.
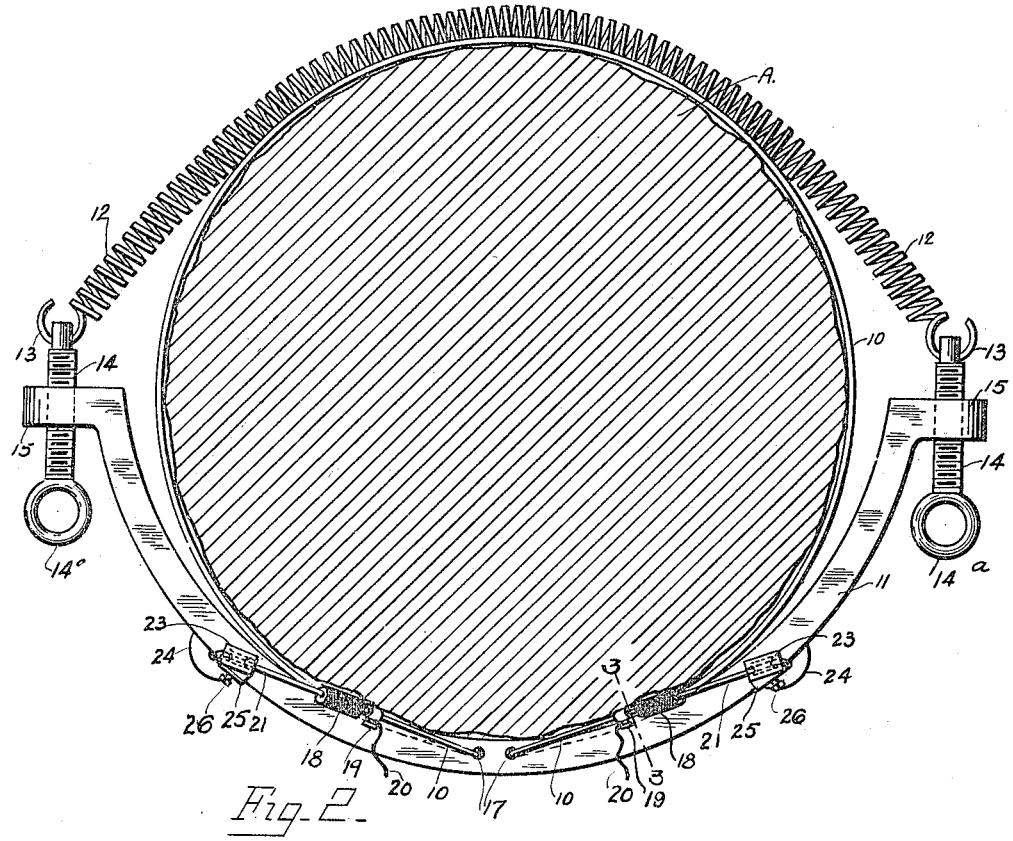
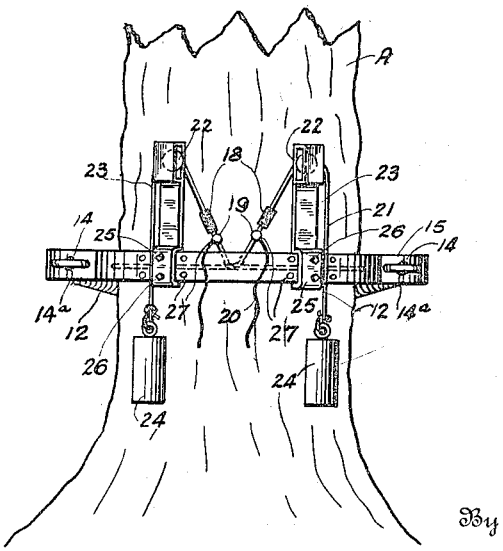
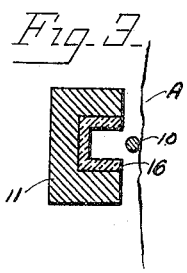
Inventor
SIDNEY C ROSENBERG

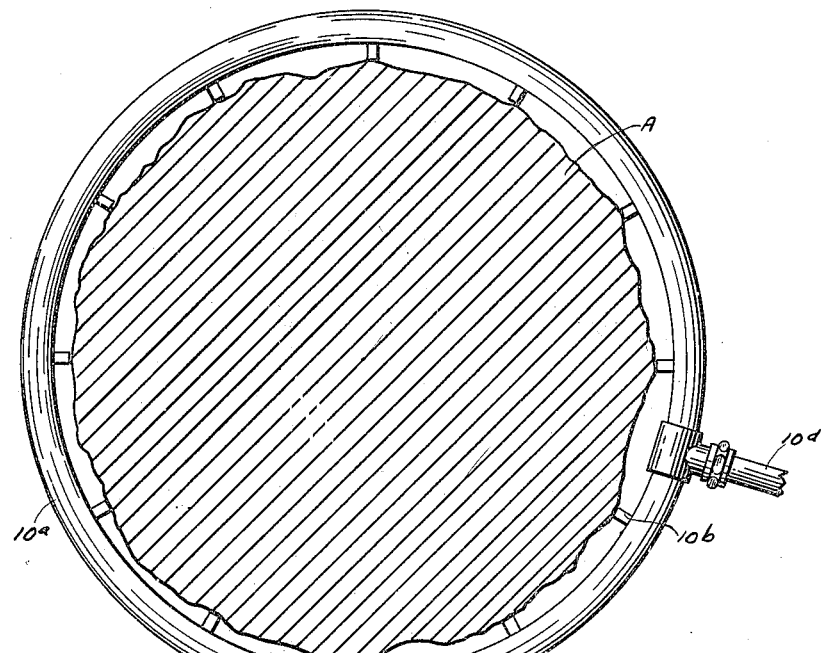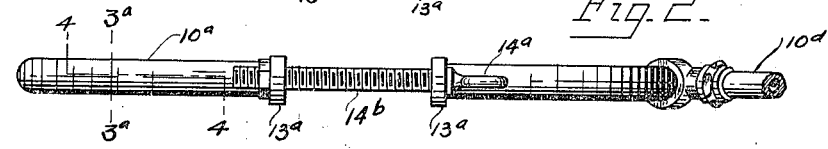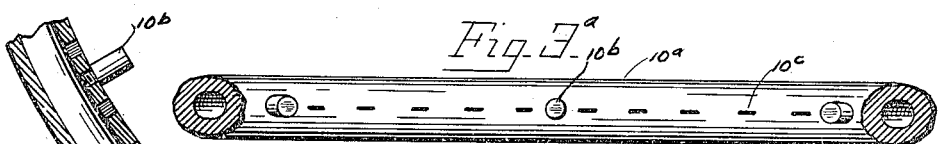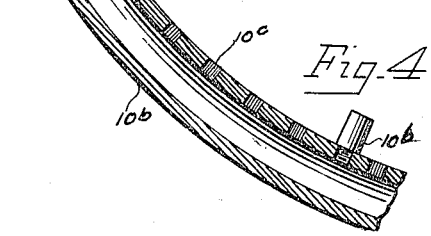

UNITED STATES PATENT OFFICE.

SIDNEY CLARENCE ROSENBERG, OF NEW HAVEN, CONNECTICUT.

TREE-FELLING DEVICE.

1,322,468.  Specification of Letters Patent.  Patented Nov. 18, 1919.

Application filed January 28, 1919. Serial No. 273,561.

*To all whom it may concern:*

Be it known that I, SIDNEY C. ROSENBERG, a citizen of the United States, and a resident of New Haven, in the county of New Haven and State of Connecticut, have invented a new and Improved Tree-Felling Device, of which the following is a description.

My invention relates to tree felling means and has for its general object to provide means to be used in lieu of an ax or a saw in felling a tree by subjecting it to a burner arranged to embrace the tree to burn an annular zone thereof and to be constricted as the burning progresses and the tree is proportionately reduced in diameter at said zone.

Reference is to be had to the accompanying drawings forming a part of this specification, it being understood that the drawings are merely illustrative of practical examples of the invention.

Figure 1 is a plan view of a tree felling device embodying my invention and utilizing an electrical heating element, the view illustrating the device applied to a tree shown in section;

Fig. 2 is a front view on a reduced scale, showing the device applied and with the pair of standards forming part of the device in a different adjustment;

Fig. 3 is an enlarged detail in cross section through approximately the line 3—3, Fig. 1;

Fig. 1ª is a view similar to Fig. 1 but employing a gas burner in lieu of an electric heating element;

Fig. 2ª is a front view of the burner shown in Fig. 1ª;

Fig. 3ª is a vertical section taken through the burner at one side as indicated by the line 3ª—3ª, Fig. 2ª;

Fig. 4 is a detail of the burner tube in horizontal section as indicated by the line 4—4, Fig. 2ª.

Referring first more particularly to Figs. 1 to 3, an electric heating element in the form of a flexible wire of proper character is adapted to be passed about a tree indicated at A and said wire is associated with a clamp comprising an arcuate rigid frame member 11 adapted to be disposed against the tree at one side and a contractile spring 12, the ends 13 of which are secured to adjusting screws 14 turning in lateral lugs 15 on the frame 11. I have shown the screws 14 as having eyes 14ª to be grasped by the fingers or to receive a tool for turning the screws, the ends 13 being shown as in the form of loops adapted to detachably engage in the ends of the screws 14 in applying the burner to a tree or in removing the same and also while turning the screws for holding the spring under the desired tension. The spring may be deflected above or below the heating element 10 as indicated in Fig. 2 so as to be out of metallic contact with said heating element.

The frame 11 is in the form of a curved channel bar as best seen in Fig. 3, the channel being insulated as at 16. Said heating element may be subjected to the influence of weights tending to constrict the same as the burning proceeds and also may be connected in any suitable manner with a source of electricity. In the illustrated form which is given as an example, the ends of the element 10 pass from the channel bar upwardly through insulated holes 17 therein; it may have binding posts applied thereto as at 19 to connect with conductor wires indicated at 20. The extreme ends of the element 10 are indicated as connected through the medium of insulating couplings 18 with a cord, wire or like flexible element 21, which runs over pulleys 22 mounted in standards 23 adjustably carried on the frame 11, said cords 21 having weights 24 suspended on the ends thereof whereby through said cords 21 to place the electrical element 10 under tension to cause it to automatically constrict as it burns into the tree. Any suitable means may be employed to adjustably secure the standards 23, there being indicated U-shaped feet 25 on said standards slidably engaging the frame 11 and provided with thumb screws 26 adapted to take into the holes 27 formed in longitudinal series in the frame 11.

Referring to Figs. 1ª, 2ª, 3ª and 4, the reference character 10ª indicates a bendable burner tube in the form of a split ring adapted to embrace the tree A for almost the complete periphery thereof and having studs 10ᵇ extending radially inward at the inside of the tube to engage the tree. The burner 10ª is provided in the illustrated example in the form of a screw 14ᵇ passing through parallel outwardly disposed lugs on the ends of the tube, said screw having an eye 14ª as in the first described construction and also being provided with a nut 14ᶜ, the arrangement permitting the burner tube to be optionally constricted through the medium of the screw 14$^b$. The tube as formed is shown with a jet 10$^c$ extending about the tube at the inner side and any suitable connection 10$^d$ is made with a source of supply for gas to pass into the burner tube and produce a Bunsen flame.

In both forms of the invention the device, it will be seen, may be expanded or constricted to adjust it to the particular tree to be felled, and a progressing constriction is provided for to cause the burner means to move radially inward as the burning action progresses.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A tree felling device adapted to embrace a tree and including burner means arranged to extend about the tree to burn the same annularly, and means to constrict said burner means as the diameter of the tree is reduced at the burned zone.

2. A tree felling device including burner means adapted to extend about the tree and to be constricted.

3. A tree felling means including supporting means, and burner means arranged to extend about the tree.

4. A tree felling device including a burner pipe presenting an annular series of jets, together with means to adjust the same about a tree.

5. A tree felling device including a burner pipe presenting an annular series of jets, together with means to adjust the same about a tree, said pipe being flexible and the adjusting means comprising a screw engaging the ends of the pipe, and members on the pipe adapted to bear against the tree.

SIDNEY CLARENCE ROSENBERG.